US008564260B2

(12) United States Patent
Carobolante et al.

(10) Patent No.: US 8,564,260 B2
(45) Date of Patent: Oct. 22, 2013

(54) DUAL-STAGE POWER CONVERSION

(75) Inventors: Francesco Carobolante, San Diego, CA (US); Aleksandar Prodic, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 12/971,758

(22) Filed: Dec. 17, 2010

(65) Prior Publication Data

US 2012/0153907 A1 Jun. 21, 2012

(51) Int. Cl.
*G05F 1/563* (2006.01)

(52) U.S. Cl.
USPC .......................... 323/266; 323/271; 323/282

(58) Field of Classification Search
USPC .......................... 323/266, 271, 282
See application file for complete search history.

(56) References Cited

U.S. PATENT DOCUMENTS

| | | | | |
|---|---|---|---|---|
| 4,533,986 | A * | 8/1985 | Jones | 363/17 |
| 4,618,812 | A * | 10/1986 | Kawakami | 323/224 |
| 6,798,177 | B1 * | 9/2004 | Liu et al. | 323/222 |
| 6,850,044 | B2 * | 2/2005 | Hansen et al. | 323/266 |
| 7,071,660 | B2 * | 7/2006 | Xu et al. | 323/266 |
| 7,456,617 | B2 * | 11/2008 | Chapuis et al. | 323/267 |
| 2007/0170897 | A1 | 7/2007 | Williams | |
| 2007/0171100 | A1 | 7/2007 | New et al. | |
| 2009/0174262 | A1 | 7/2009 | Martin et al. | |
| 2009/0201706 | A1 | 8/2009 | Zacharias et al. | |
| 2012/0153907 | A1 * | 6/2012 | Carobolante et al. | 323/266 |

OTHER PUBLICATIONS

International Search Report and Written Opinion—PCT/US2011/065697—ISA/EPO—Sep. 4, 2012.
Robert C.N. Pilawa-Podgurski, David M. Giuliano, David I. Perreault, "Merged Two-Stage Power Converter Architecture with SoftCharging Switched-Capacitor Energy Transfer," Laboratory for Electromagnetic and Electronic Systems Massachusetts Institute of Technology, Cambridge, USA, 978-1-4244-1668-4/08/IEEE, pp. 4008-4015.
Volkan Kursun, Siva G. Narendra, Vivek K. DE, and Eby G. Friedman, "Low-Voltage-Swing Monolithic dc-dc Conversion," IEEE Transactions on Circuits and Systems-II: Express Briefs, vol. 51, No. 5, May 2004, pp. 241-248.
Yuancheng Ren, "High Frequency, High Efficiency Two-Stage Approach for Future Microprocessors," Dissertation submitted to the Faculty of the Virginia Polytechnic Institute and State University, Apr. 22, 2005, Blacksburg, Virginia, 207 pages.
Hirotaka Nakanishi, Yoshihiro Tomihisa, Terukazu Sato, Takashi Nabeshima, Kimihiro Nishijima, and Tadao Nakano, "A Two-stage Converter with a Coupled-Inductor," PEDS 2007, Oita University, 700.Dannoharu.Oita.Japan 870-1192, pp. 653-657.

* cited by examiner

*Primary Examiner* — Jeffrey Sterrett
(74) *Attorney, Agent, or Firm* — Nicholas J. Pauley; Peter Kamarchik; Joseph Agusta (57) ABSTRACT

A circuit converts an input voltage to an output voltage. The circuit includes a first stage voltage converter that receives the input voltage and converts the input voltage. The first stage voltage converter includes a first buck converter having a double rail output: a first rail at a high intermediate voltage and a second rail at a low intermediate voltage. The circuit also includes a second stage voltage converter that receives the output rails and produces the output voltage.

14 Claims, 7 Drawing Sheets

DUAL-STAGE POWER CONVERSION

TECHNICAL FIELD

This disclosure generally relates to power conversion and, more specifically, to power conversion with a dual-stage converter.

BACKGROUND

Various power converters are known in the art and used in many applications currently in the marketplace. A generalized example of one type of power converter is the conventional buck converter 100 of FIG. 1. The buck converter 100 is a Direct Current (DC)-DC converter, such as may be used to decrease the voltage from a battery and supply a DC voltage to an electronic component.

Figure 1:
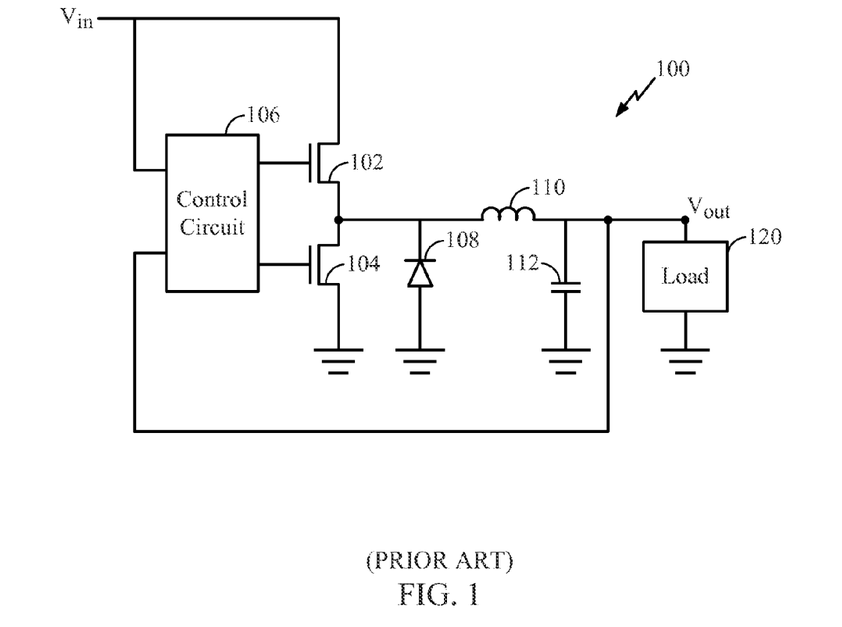
FIG. 1 is a generalized example of one type of conventional power converter.

The buck converter 100 includes transistors 102, 104 that are controlled by a control circuit 106. The buck converter also includes a diode 108, a capacitor 112, and an inductor 110. A load 120 receives the output voltage of the buck converter 100. The control circuit 106 varies the duty cycles at which the transistors 102, 104 are turned on to alternately connect and disconnect the inductor 110 with the source voltage (Vin). As the inductor 110 stores energy and discharges the energy, it produces the output voltage (Vout), which is somewhat smaller than the source voltage.

Figure 2:
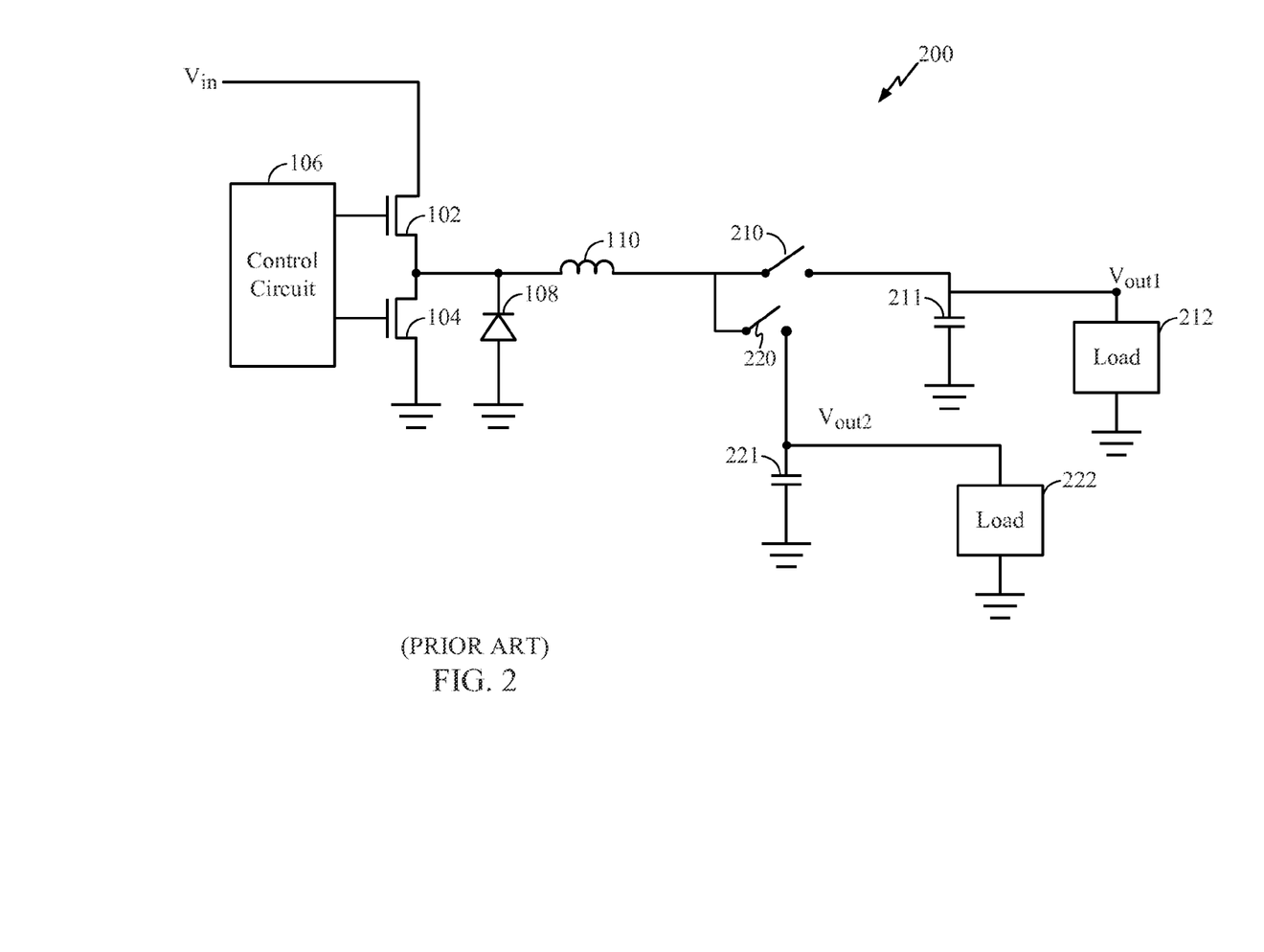
FIG. 2 is another example of a conventional power converter.

Another example of a conventional power converter is shown in FIG. 2. The power converter 200 includes switches 210, 220, which complete paths to two separate capacitors 211, 221. The power converter 200 produces two output voltages (Vout1 and Vout2) and supplies two different loads 212, 222. In some implementations, the output voltages are different.

Such power converters find use in a wide assortment of consumer devices, such as cellular phones and laptop computers. An example use of a DC-DC power converter is to reduce a voltage from a battery to a voltage for use in a processor device. A fast transient response is desirable in order to keep up with the moment-to-moment power consumption of a high performance processor core. Furthermore, a fast transient response may help to provide fast settling efficiently when fast dynamic voltage scaling is employed. Thus, it is desirable to use very high frequencies in a DC-DC converter that is paired with a digital core. It is also desirable to limit the size of passive components so they can be placed close to the load.

However, when a direct conversion from battery voltage is employed, the necessary voltage rating of the Metal Oxide Semiconductor (MOS) transistors may force the use of transistors that are very lossy at high frequency. On the other hand, operation at low frequency involves the use of bulky inductors and capacitors, which take up large amounts of board space, especially when multiple voltage domains are used.

BRIEF SUMMARY

According to one embodiment, a circuit that converts an input voltage to an output voltage is disclosed. The circuit includes a first stage voltage converter that receives the input voltage and converts the input voltage. The first stage voltage converter has a double rail output: a first rail at a high intermediate voltage and a second rail at a low intermediate voltage. The circuit also includes a second stage voltage converter that receives the double rail output and produces the output voltage.

According to another embodiment, a method for converting an input voltage to an output voltage is disclosed. The method includes receiving the input voltage at a first stage voltage converter. The first stage voltage converter includes a double rail output. The method also includes supplying a high intermediate voltage at a first rail and a low intermediate voltage at a second rail, receiving the high and low intermediate voltages at a second stage voltage converter, and producing the output voltage from the high and low intermediate voltages at the second stage voltage converter.

According to yet another embodiment, a circuit that converts an input voltage to an output voltage is disclosed. The circuit has means for generating first and second intermediate voltages from the input voltage, the generating means comprising a first buck converter. The generating means comprising a double rail output The circuit also has means for producing the output voltage from the first and second intermediate voltages.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the technology of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Various embodiments provide for a dual-stage power converter circuit having a first stage that provides a battery interface and high efficiency, coarse regulation to two intermediate voltages that are above and below the target voltage. A second stage provides high performance regulation and, in some instances can be integrated or co-packaged with a load, such as a processor or chip package.

Figure 3:
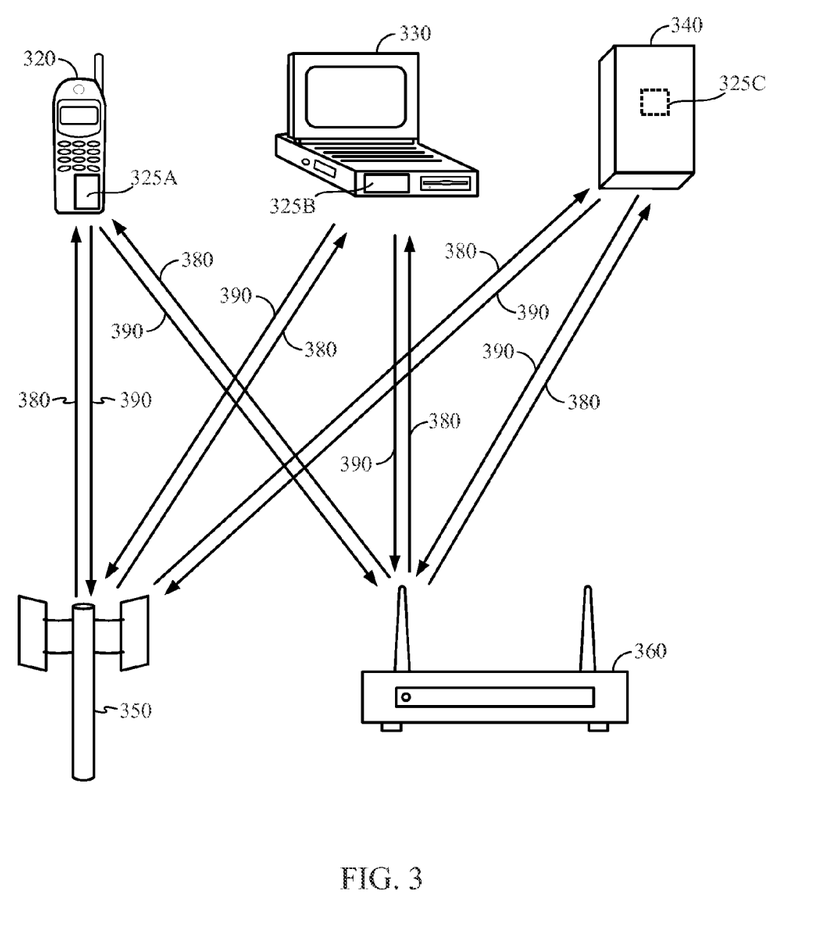
FIG. 3 shows an exemplary wireless communication system in which an embodiment of the disclosure may be advantageously employed.

FIG. 3 shows an exemplary wireless communication system 300 in which an embodiment of the disclosure may be advantageously employed. For purposes of illustration, FIG. 3 shows three remote units 320, 330, and 340 and two base stations 350 and 360. It will be recognized that wireless communication systems may have many more remote units and base stations. Remote units 320, 330, and 340 include improved semiconductor die packages 325A, 325B, and 325C, respectively, which implement embodiments discussed further below. FIG. 3 shows forward link signals 380 from the base stations 350 and 360 and the remote units 320, 330, and 340 and reverse link signals 390 from the remote units 320, 330, and 340 to base stations 350 and 360.

In FIG. 3, remote unit 320 is shown as a mobile telephone, remote unit 330 is shown as a portable computer, and remote unit 340 is shown as a computer in a wireless local loop system. For example, the remote units may be mobile phones, hand-held personal communication systems (PCS) units, portable data units such as personal data assistants, GPS enabled devices, navigation devices, set top boxes, media players, such as music players, video players, and entertainment units, fixed location data units such as meter reading equipment, or any other device that stores or retrieves data or computer instructions, or any combination thereof. Although FIG. 3 illustrates remote units according to the teachings of the disclosure, the disclosure is not limited to these exemplary illustrated units. The disclosure may be suitably employed in any device which includes a DC-DC power converter, whether or not in a wireless communication system.

Figure 4:
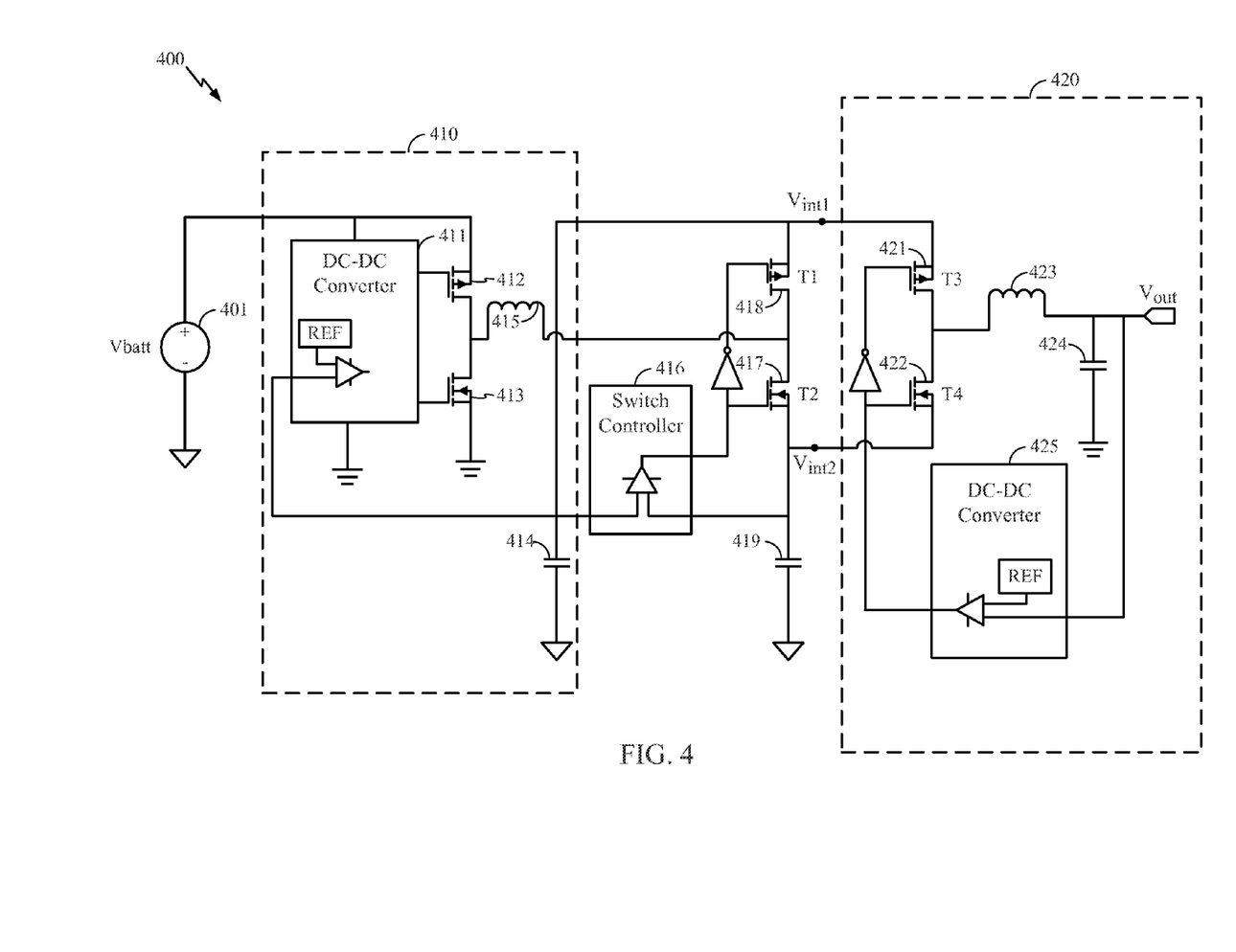
FIG. 4 is an illustration of an exemplary power converter adapted according to one embodiment.

FIG. 4 is an illustration of an exemplary power converter 400 adapted according to one embodiment. The power converter 400 includes two stages 410, 420. A first stage 410 receives an input DC voltage (Vbatt) from a voltage source 401 and outputs two intermediate voltages Vint1, Vint2. The first stage 410 may include a buck converter that has a control circuit 411, transistors 412, 413, an inductor 415, and a capacitor 414. The control circuit 411 controls the duty cycles at which the transistors 412, 413 are turned on to produce the intermediate voltages Vint1, Vint2. The control circuit 411, in this example, operates at 1 MHz, though the scope of embodiments is not so limited, as the control circuit 411 may be operated at any practical frequency. The control circuit 411 is part of a feedback loop that measures Vint1 against a reference to keep Vint1 within a desired range. A switch control circuit 416 is part of the feedback loop that includes the control circuit 411, and it compares Vint1 and Vint2. Based on the comparison, the switch control circuit 416 controls the duty cycles of the transistors 417, 418 so as to control the voltage difference between Vint1 and Vint2.

In this example embodiment, the intermediate voltages Vint1, Vint2 are different than ground and are, instead, floating voltages produced by operation of the buck converter in the first stage 410. From the point of view of the second stage 420, the intermediate voltages Vint1, Vint2 are referenced to each other rather than to ground. Further in this example, the intermediate voltages Vint1, Vint2 may have a difference that is smaller than the output voltage Vout. In other words, the absolute value of Vint1 minus Vint2 is less than the absolute value of Vout.

The second stage 420 receives the intermediate voltages Vint1, Vint2 and produces output voltage Vout using another buck converter structure. The second stage 420 includes transistors 421, 422, an inductor 423, a capacitor 424, and a control circuit 425. The inductor 423 alternately receives each of the intermediate voltages Vint1, Vint2, according to the operation of the transistors 421, 422. The control circuit 425 controls the duty cycles at which the transistors 421, 422 turn on, based on a comparison of the output voltage Vout to a reference, to hold the output voltage Vout within a desired range.

The control circuit 425 in this example may include a buck converter that operates at 100 MHz, though the scope of embodiments is not so limited. In various embodiments, the control circuit 425 operates at a much higher frequency (e.g., one hundred times greater or more) than does the control circuit 411 of the first stage 410. Thus, the power converter circuit of FIG. 4 includes a first low-frequency stage 410 that converts a high input voltage to two lower intermediate voltages and a high-frequency second stage that converts the intermediate voltages into the output voltage.

It is noted that the voltage to which the inductor 423 is exposed is smaller than the voltage to which the inductor 415 is exposed. The voltage applied to the inductor 415 spans the range from Vbatt to ground, while the voltage applied to the inductor 423 is limited to the difference between Vint1 and Vint2. In some instances, the voltage across the inductor 415 may be twice as large or larger than the voltage across the inductor 423. Also, the voltages across the transistors 412, 413 may be twice as large or larger than the voltages across the transistors 417, 418, 421, 422.

For buck converters, the size of an inductor can be decreased as the voltage to which the inductor is exposed is decreased and as the frequency of operation is increased. In one aspect, a lower voltage allows use of smaller inductors, generally. In another aspect, a lower voltage applied to the transistors 421, 422 and the inductor 432 allows use of lower voltage semiconductor devices, thus allowing higher frequency operation (where higher frequencies allow the use of smaller inductors, generally). Such relationships holds true in the power converter 400. For instance, in one example, the power converter 400 receives a source voltage Vbatt of 3.6V and converts the voltage to 1.8V at the output voltage Vout. In this example, the inductor 415 may be about 4.7 µH, whereas the inductor 423 may be about 10 nH or less. Furthermore, the use of smaller inductors at higher frequencies may allow the use of smaller capacitors as well. For instance, in some examples, the capacitors 414 and 419 may be about 5 µF, and the capacitor 424 may be about 30 nF (though the scope of embodiments is not so limited).

As explained above, the second stage 420 operates at relatively high frequencies on coarsely adjusted intermediate voltages, where the difference between the intermediate voltages may be smaller than the output voltage. As a result, the second stage may include relatively small inductors, transistors, and capacitors that may, in some instances, be suitable for integration in a semiconductor chip or co-packaging with a semiconductor chip. Example configurations of the power converter 400 in chip package applications are shown in FIGS. 4-8.

Figure 5:
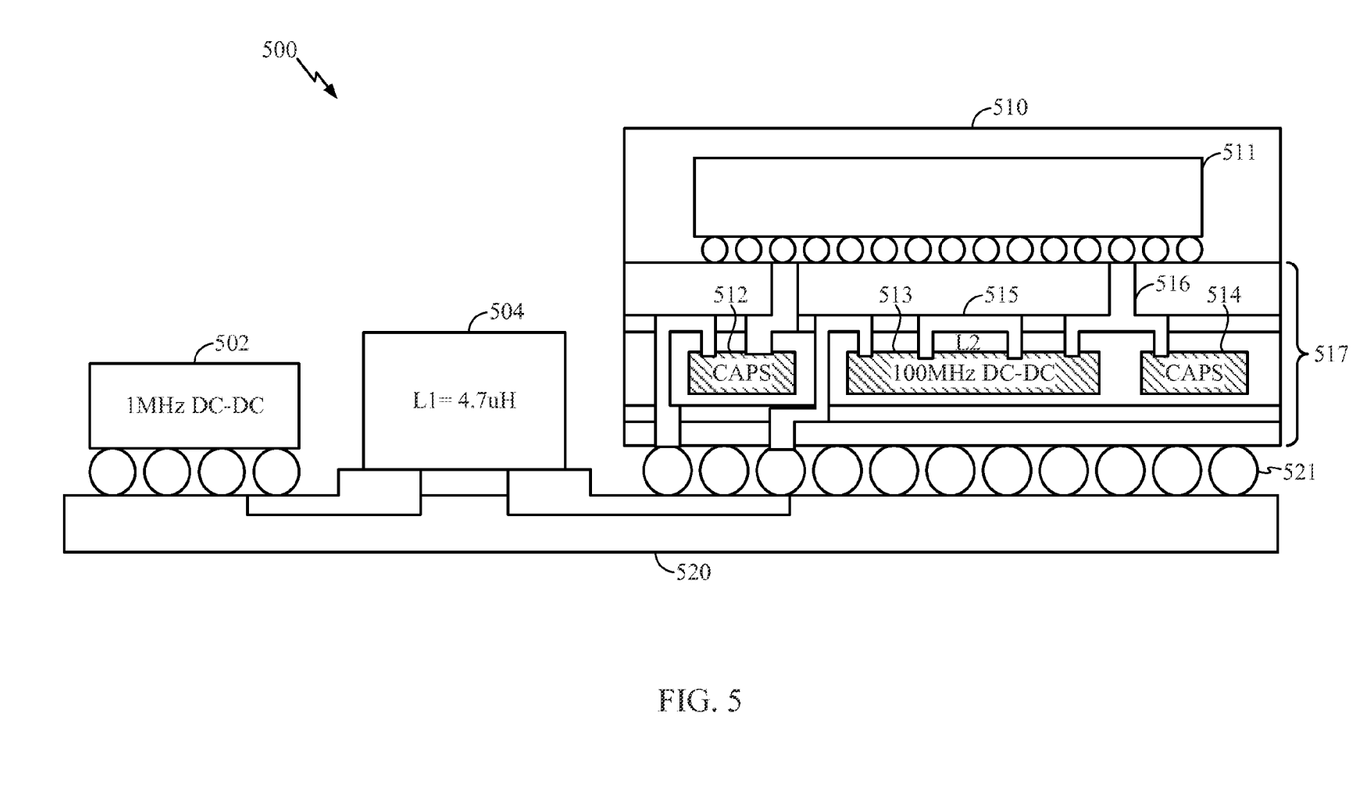
FIG. 5 is an illustration of an exemplary circuit with a DC-DC converter packaged therein according to an embodiment.

FIG. 5 is an illustration of an exemplary circuit 500 with a DC-DC converter packaged therein according to an embodiment. The circuit 500 includes a chip package 510 mounted upon a circuit board 520 using solder balls of which the solder ball 521 is one example. The chip package 510 includes a multi-core processor 511 in electrical communication with a substrate 517. The substrate 517 is in communication with the circuit board 520 and the multi-core processor 511 using through vias, of which the via 516 is one example.

Within the substrate 517 are capacitors 512, 514, an inductor 515 (shown in this example as a wire trace), and a 100

MHz DC-DC controller 513. The capacitors 512, 514 are part of the second DC-DC conversion stage. While not shown herein, it is understood that the first DC-DC conversion stage may include larger capacitors that are outside of the chip package 510. A 1 MHz DC-DC controller 502 and the inductor 504 are also part of the first DC-DC conversion stage.

In this embodiment, the inductor 504 is a discrete component mounted to a circuit board 540. By contrast, the capacitors 512, 514 are integrated devices. The chip package 510 uses 20-30 μm copper traces, and the processor 511 uses a 65 nm 1.2V single oxide process. The inductor 515 may be made on a semiconductor material (e.g., silicon) with a permalloy and copper layer, but can alternatively be implemented in an interconnect layer.

In this example, the entirety of the second stage, which steps the intermediate voltage down to the voltage of the processor 511, is disposed in the substrate 517. In other embodiments, all or part of the second stage (e.g., DC-DC controller 513) may be implemented within the processor 511. Such integration is possible because of the lower voltage seen at the input to the second stage and the high frequency of the controller 513.

The circuit 500 is illustrative, and the scope of embodiments is not limited thereto. For instance, various embodiments may use technologies other than circuit boards and solder balls, yet still be adapted according to the concepts disclosed herein. Furthermore, different values for inductance, capacitance, and frequency may be used for any of the embodiments herein.

Figure 6:
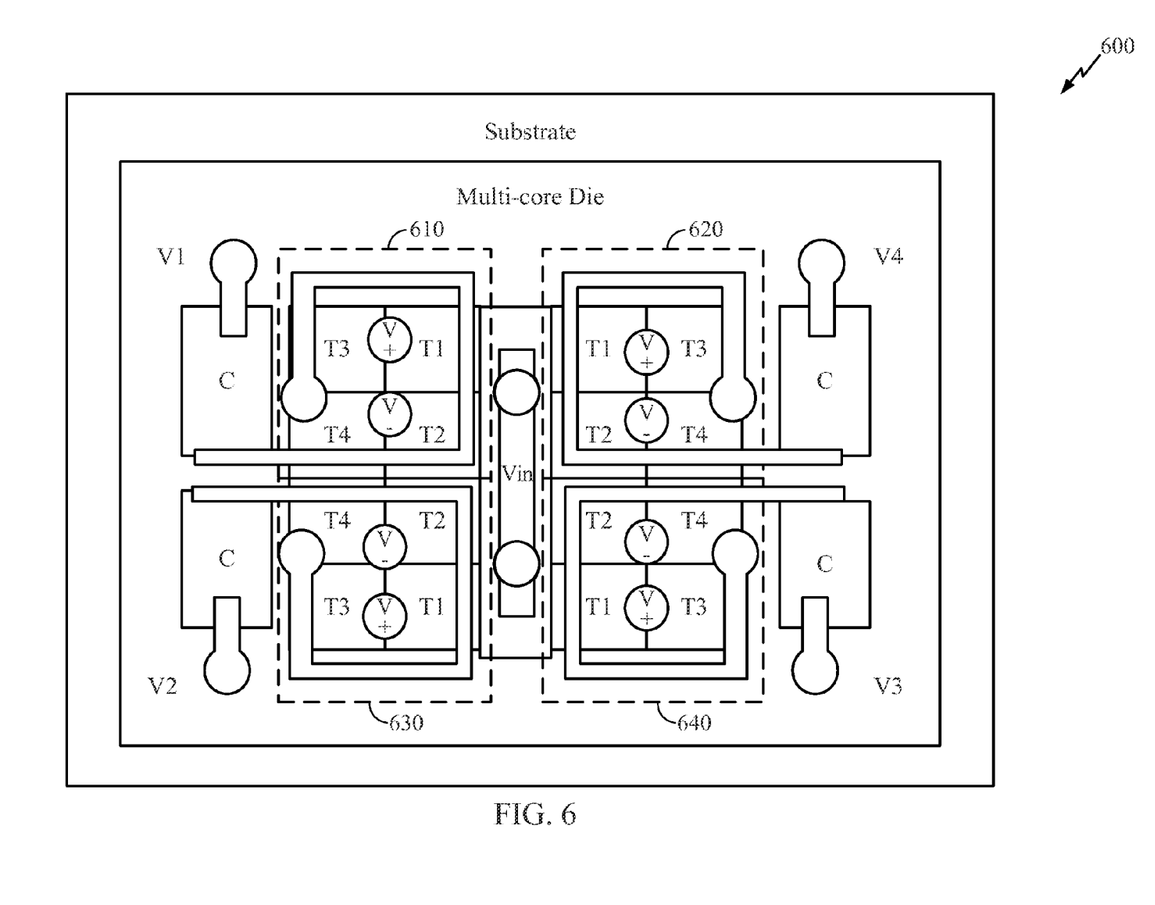
FIG. 6 is an illustration of an exemplary chip package according to an embodiment.

FIG. 6 is an illustration of an exemplary chip package 600 according to an embodiment. The chip package 600 may be in communication with a first stage of DC-DC conversion in the same way as the chip package 510 is in communication with the first stage of DC-DC conversion. For instance, the chip package 600 may be mounted to a circuit board along with other DC-DC conversion components.

The chip package 600 is offered to show that various embodiments may be implemented with multiple outputs. For instance, the chip package 600 includes four sets of second stage DC-DC conversion circuitry 610, 620, 630, 640. Each set of circuitry 610, 620, 630, 640 includes four transistors, comparable to the transistors T1-T4 in FIG. 4.

Figure 7:
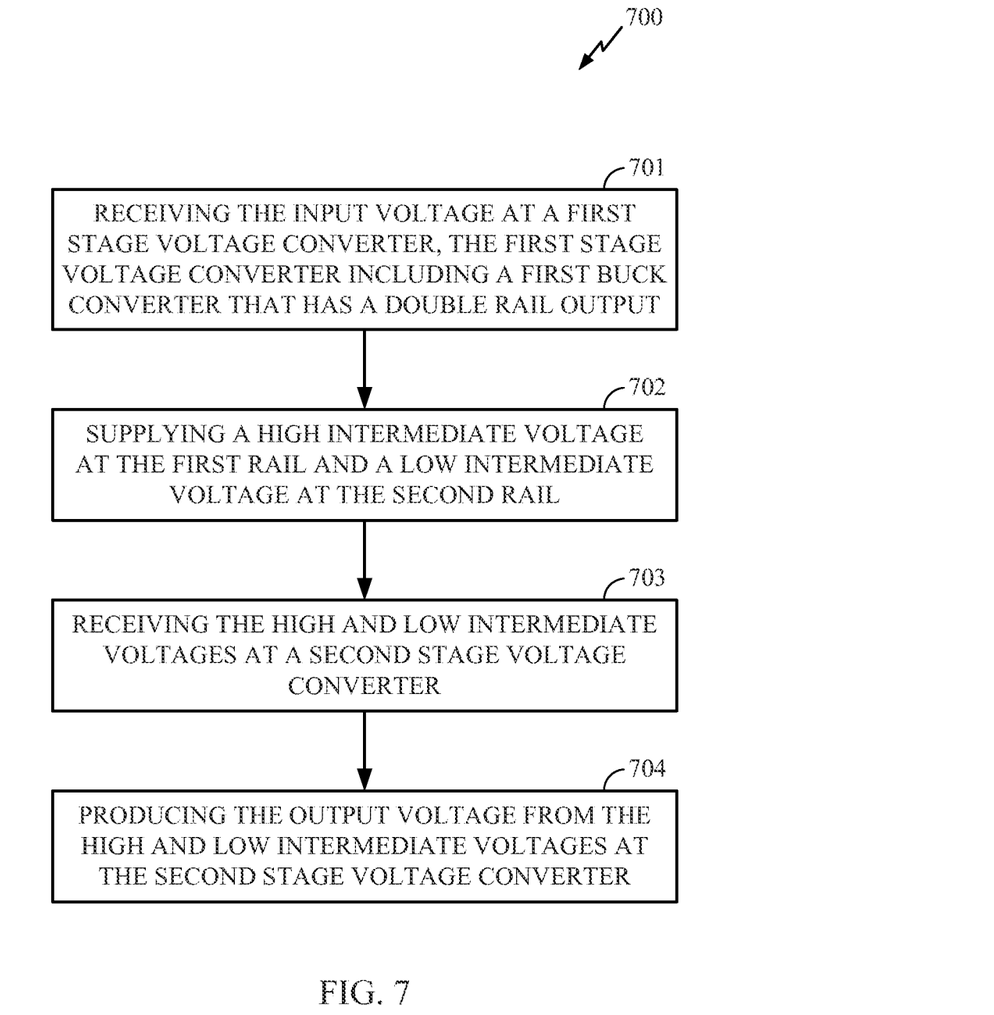
FIG. 7 is an illustration of an exemplary method adapted according to one embodiment.

FIG. 7 is an illustration of an exemplary method 700 adapted according to one embodiment. The method 700 may be performed, for example, by a dual-stage power converter, such as that shown in FIG. 4, that receives an input voltage and produces an output voltage.

In block 701, an input voltage is received at a first stage voltage converter. The first stage voltage converter includes a first buck converter having a double rail output. In one embodiment, the first stage converter is a low-frequency voltage converter.

In block 702, a high intermediate voltage is supplied at the first rail, and a low intermediate voltage is supplied at the second rail. In some embodiments, the difference between the high and low intermediate voltages is less than the output voltage.

In block 703, the high and low intermediate voltages are received at a second stage voltage converter. In one example, the second stage voltage converter is a high-frequency voltage converter.

In block 704, the output voltage is produced from the high and low intermediate voltages at the second stage voltage converter. In some embodiments, the second stage voltage converter supplies power to a high-performance load, such as a semiconductor chip or a chip package. In such embodiments, it may be possible to implement at least part of the second stage voltage converter within the load.

The scope of embodiments is not limited to the example of FIG. 7. Various embodiments may add, omit, rearrange, or modify actions in the method 700. For instance, some embodiments may include multiple second stage voltage converters, each of the second stages providing an output voltage. In another aspect, some embodiments operate continuously as the input voltage fluctuates and the power consumption of the load changes.

Moreover, the previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the features shown herein but is to be accorded the widest scope consistent with the principles and novel features disclosed herein.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A circuit that converts an input voltage to an output voltage, the circuit comprising:
   a first stage voltage converter that receives the input voltage and converts the input voltage, the first stage voltage converter comprising a first rail at a high intermediate voltage and a second rail at a low intermediate voltage; the low intermediate voltage above ground; the first stage voltage converter comprising a first inductor;
   a first capacitor at the high intermediate voltage;
   a second capacitor at the low intermediate voltage;
   a first transistor to couple the first inductor to the first capacitor when switched on;
   a second transistor to couple the first inductor to the second capacitor when switched on;
   a switch controller to control the duty cycles of the first and second transistors to control a voltage difference between the high intermediate voltage and the low intermediate voltage; and
   a second stage voltage converter that receives the high intermediate voltage and the low intermediate voltage and produces the output voltage; the second stage voltage converter comprising a second inductor; a third transistor to provide the high intermediate voltage to the second inductor when switched on; a fourth transistor to provide the low intermediate voltage to the second inductor when switched on; and a control circuit to control the duty cycles of the third and fourth transistors to hold the output voltage within a desired range.

2. The circuit of claim 1 in wherein the first stage voltage converter comprises a first buck converter and the second stage voltage converter comprises a second buck converter.

3. The circuit of claim 1 in which a difference between the high intermediate voltage and the low intermediate voltage is less than the output voltage.

4. The circuit of claim 1, in which the circuit is integrated into a semiconductor die.

5. The circuit of claim 1 in which the second stage voltage converter is integrated into a semiconductor die with a load that utilizes the output voltage.

6. The circuit of claim 1 in which the first stage voltage converter operates at a first frequency and in which the second stage voltage converter operates at a second frequency higher than the first frequency.

7. The circuit of claim 6 in which the first frequency is less than one one-hundredth of the second frequency.

8. The circuit of claim 1 incorporated into a device selected from a group consisting of a music player, a video player, an entertainment unit, a. navigation device, a communications device, a personal digital assistant (PDA), a fixed location data unit, and a computer.

9. A circuit hat converts an input voltage to an output voltage, the circuit comprising:
   means for generating first and second intermediate voltages from the input voltage, the means for generating first and second intermediate voltages comprising
      a first capacitor at the first intermediate voltage;
      a second capacitor at the second intermediate voltage:
      a first transistor to couple the first inductor to the first capacitor when switched on;
      a second transistor to couple the firs in( actor to the second capacitor when switched on; and
      a switch controller to control the duty cycles of the first and second transistors to control a voltage difference between the first intermediate voltage and the second intermediate voltage; and
   means for producing the output voltage from the high and low intermediate voltages the means for producing the output voltage comprising
      a second inductor;
      a third transistor to provide h first intermediate voltage to the second inductor when switched on;
      a fourth transistor to provide the second intermediate voltage to the second inductor when switched on; and
      a control circuit to control the duty cycles of the third and fourth transistors hold the output voltage within a desired range.

10. The circuit of claim 9 in which a difference between the first intermediate voltage and the second intermediate voltage is less than the output voltage.

11. The circuit of claim 9 in which the generating means operates at a first frequency and in which the producing means operates at a second frequency higher than the first frequency.

12. The circuit of claim 11 in which the first frequency is less than one one-hundredth of the second frequency.

13. The circuit of claim 9 incorporated into a device selected from a group consisting of a music player, a video player, an entertainment unit, a navigation device, a communications device, a personal digital assistant (PDA), a fixed location data unit, and a computer.

14. The circuit of claim 9, in which the circuit is integrated into a semiconductor die.

\* \* \* \* \*